(12) United States Patent
Wu et al.

(10) Patent No.: US 12,465,037 B2
(45) Date of Patent: Nov. 11, 2025

(54) TERMITE MONITORING AND KILLING SYSTEM

(71) Applicant: Wuhan Newfiber Optoelectronics Co., Ltd, Wuhan (CN)

(72) Inventors: Zhiguo Wu, Wuhan (CN); Yin Chen, Wuhan (CN); Chunping Zhang, Wuhan (CN); Shibing Xue, Wuhan (CN); Chia-Chuan Chang, Wuhan (CN); Jiachen Wang, Wuhan (CN); Shibo Zhang, Wuhan (CN)

(73) Assignee: Wuhan Newfiber Optoelectronics Co., Ltd, Wuhan (CN)

( * ) Notice: Subject to any disclaimer, the term of this patent is extended or adjusted under 35 U.S.C. 154(b) by 0 days.

(21) Appl. No.: 18/916,327

(22) Filed: Oct. 15, 2024

(65) Prior Publication Data

US 2025/0221393 A1     Jul. 10, 2025

(30) Foreign Application Priority Data

Jan. 8, 2024   (CN) .......................... 202410027700.3
Jan. 8, 2024   (CN) .......................... 202420042224.8
Jan. 8, 2024   (CN) .......................... 202420047127.8

(51) Int. Cl.
    *A01M 1/02*      (2006.01)
    *A01M 1/20*      (2006.01)
    *G05B 23/02*     (2006.01)
    *G06V 40/10*     (2022.01)
    *H04W 4/70*      (2018.01)

(52) U.S. Cl.
    CPC .......... *A01M 1/026* (2013.01); *A01M 1/2011* (2013.01); *G05B 23/0235* (2013.01); *G06V 40/103* (2022.01); *H04W 4/70* (2018.02); *A01M 2200/011* (2013.01)

(58) Field of Classification Search
    CPC ... A01M 1/2005; A01M 1/2011; A01M 1/026
    See application file for complete search history.

(56) References Cited

U.S. PATENT DOCUMENTS

| | | | |
|---|---|---|---|
| 11,344,020 B1 * | 5/2022 | Hajtmacher .......... | A01M 1/026 |
| 2005/0025357 A1 * | 2/2005 | Landwehr ............. | A01M 3/005 |
| | | | 382/224 |
| 2021/0131954 A1 * | 5/2021 | Shinotsuka ........... | G01J 5/0893 |

FOREIGN PATENT DOCUMENTS

CN              104065931 A   *   9/2014

* cited by examiner

*Primary Examiner* — Christopher D Hutchens
(74) *Attorney, Agent, or Firm* — Westbridge IP LLC

(57) ABSTRACT

A termite monitoring and killing system includes a plurality of termite monitoring and killing devices, where the plurality of termite monitoring and killing devices are distributed and buried in termite infested areas, and are configured to lure termites into the devices to feed, acquire a termite feeding image regularly, and deliver termite insecticide powder according to user requirements. According to the present disclosure, baits are buried in the area where there may be termites after being placed in the termite monitoring and killing device, so as to induce foraging termites to enter. Termite images in the termite monitoring and killing device are acquired regularly, so that termite image data is transmitted to a monitoring information processing platform to be processed and analyzed through a data relay station.

9 Claims, 7 Drawing Sheets

TERMITE MONITORING AND KILLING SYSTEM

CROSS-REFERENCE TO RELATED APPLICATIONS

The application claims priority to Chinese Patent Application No. 202410027700.3, filed on Jan. 8, 2024, Chinese Patent Application No. 202420042224.8, filed on Jan. 8, 2024, and Chinese Patent Application No. 202420047127.8, filed on Jan. 8, 2024, the contents of which are incorporated herein by reference in their entireties.

TECHNICAL FIELD

The present disclosure relates to the technical field of termite prevention and control, and in particular to a termite monitoring and killing system.

BACKGROUND

Termites are one of the main pests that harm lawns, trees, and buildings. In order to protect the integrity of buildings and crops, it is necessary to control the number of termites. In order to reduce the harm to the environment, the concept of integrated pest management is now introduced in termite prevention and control. The main purpose of the concept is to reduce the use of powder in the prevention and control process and protect the environment. The implementation of the concept needs to monitor termites first to obtain termite situation information, so that exterminators can grasp the best time to kill termites. After that, exterminators will deliver termite insecticide powder at the monitoring point according to the requirements to achieve the termite killing operation.

The traditional termite monitoring methods require exterminators to go on site to survey and bury monitoring boxes, and then dig out the monitoring boxes for observation after a period of time, which is poor in timeliness. At the same time, it is difficult for the traditional methods to determine the position of termite colonies based on the termite situation. In the process of killing termites, insecticide powder will be delivered in a plurality of monitoring boxes. Excessive powder will result in waste and increase the pressure of toxic chemicals on the urban ecosystem.

SUMMARY

The purpose of the present disclosure is to provide a termite monitoring and killing system to address the above-mentioned deficiencies, thereby achieving the purpose of improving monitoring convenience and delivering powder accurately.

In order to solve the technical problems, the present disclosure uses the following technical scheme. A termite monitoring and killing system is provided, including:
- a plurality of termite monitoring and killing devices, where the plurality of termite monitoring and killing devices are distributed and buried in termite infested areas, and are configured to lure termites into the devices to feed, acquire a termite feeding image regularly, and deliver termite insecticide powder according to user requirements automatically or in a remote control manner;
- at least one data relay station, where the data relay station is configured to be communicated with the plurality of termite monitoring and killing devices, and receive and send data;
- a monitoring information processing platform, where the monitoring information processing platform is configured to be communicated with the data relay station, receive and summarize termite feeding image data, form continuous termite monitoring historical data after the obtained image data is removed by noise and abnormal data is filtered, analyze and obtain a distribution trend of a termite colony in an area where the termite monitoring and killing device is buried according to the time, the position and the number of termites in the termite monitoring historical data, analyze and simulate path data according to a distribution density of termites and the time when termites appear, determine a termite traveling path, analyze a path convergence node according to different traveling paths, predict data of an area where a mother colony is located according to the node distribution finally, and supplement, correct and verify an original analysis result in time when the subsequent data is supplemented;
- a user control terminal, where the user control terminal is configured to log in to the monitoring information processing platform by a user to check termite monitoring data and usage of consumables in the termite monitoring and killing device, and to issue a control instruction to the monitoring information processing platform to control the operation of the termite monitoring and killing device.

Further, the monitoring information processing platform includes an image identification module, an analyzing and processing module, a device management module and a communication interaction module; the image identification module is configured to identify the termite feeding image, count the number of termites in the image, and bind data about the number of termites with the position of the termite monitoring and killing device and the image acquisition time to obtain termite monitoring data; the analyzing and processing module is configured to process the summarized termite monitoring data, judge whether a summarized data amount meets a minimum processing requirement according to a preset threshold by comparing the summarized termite monitoring data with historical data, continue data acquisition if the data amount is low, analyze the termite traveling path through a data analysis algorithm if the data amount exceeds the threshold, and analyze an area where a termite colony is located according to the time and the density when termites appear; the device management module is configured to control the termite monitoring and killing device and the data relay station, receive operation information of the termite monitoring and killing device and the data relay station, and issue early warning information to the user control terminal when the device fails and usage of consumables exceeds a threshold range by setting an early warning threshold; and the communication interaction module is configured to be communicated with the data relay station and the user control terminal.

Further, the termite monitoring and killing device includes a barrel body and a barrel cover provided at the top of the barrel body detachably, a side wall of the barrel body is provided with a plurality of strip-shaped holes through which termites enter the barrel body, and the bottom of the barrel cover is provided with a monitoring camera which is configured to monitor termites and a powder delivery mechanism which is configured to deliver annular powder into the barrel body.

Further, the powder delivery mechanism includes a hollow powder storage ring provided at the bottom of the barrel cover, the bottom of the hollow powder storage ring is provided with a powder outlet communicated with an inner cavity of the hollow powder storage ring, the bottom of the hollow powder storage ring is provided with a blocking ring and a driving component configured to drive the blocking ring to move up and down, the powder outlet is blocked by the blocking ring when the blocking ring is located at an upper limit position, and the top of the blocking ring is provided with an inclined plane for guiding powder to slide off the blocking ring.

Further, the driving component includes at least one support provided on the hollow powder storage ring, the bottom of the support is provided with a T-shaped block inserted into the support, one end of the T-shaped block which is located outside the support is connected to the blocking ring, one end of the T-shaped block which is located inside the support is provided with a tension spring connected with the support, a telescopic cavity in which the T-shaped block moves up and down is provided in the support, when the tension spring is in a natural state, the powder outlet is blocked by the blocking ring, an electromagnet which is located at the top of the T-shaped block is provided in the telescopic cavity, and the electromagnet has the same magnetic pole as that of the opposite side of the T-shaped block.

Further, the termite monitoring and killing device further includes a dirt cleaning mechanism provided at the bottom of the barrel cover, which is configured to clean dirt attached to a camera end of the monitoring camera; the dirt cleaning mechanism includes a compressed air storage tank provided at the bottom of the barrel cover, an electromagnetic valve communicated with the compressed air storage tank is provided on the compressed air storage tank, and an end of the electromagnetic valve far away from the compressed air storage tank is provided with a nozzle for blowing air to the camera end of the monitoring camera.

Further, the inner cavity of the hollow powder storage ring is provided with a powder storage area and a dispersing component working area which are independent from each other, the powder outlet is communicated with the powder storage area, and the hollow powder storage ring is provided with a powder supplementing mechanism; the powder supplementing mechanism includes a powder injection pipe communicated with the powder storage area, a partition plate provided in the dispersing component working area and a three-position four-way valve communicated with the dispersing component working area, the three-position four-way valve is provided with an air inlet pipe, an air outlet pipe, a first connecting pipe, and a second connecting pipe, the air inlet pipe is communicated with the compressed air storage tank, the first connecting pipe and the second connecting pipe are both communicated with the dispersing component working area and are located at both sides of the partition plate, and the three-position four-way valve is configured to switch the state that the air inlet pipe and the air outlet pipe are communicated with the first connecting pipe and the second connecting pipe; the powder supplementing mechanism further includes a piston provided in the dispersing component working area and a shifting block provided in the powder storage area, the piston and the shifting block are attracted to each other through magnetism, the piston is provided with grooves at both sides along the moving direction of the dispersing component working area, through which the first connecting pipe and the second connecting pipe supply air, and the bottom of the shifting block is provided with through-holes through which powder passes.

Further, the top of the barrel cover is provided with a threaded mounting seat, and the threaded mounting seat is in threaded connection with a signboard for marking the position of the barrel body and warning people around.

Further, a threaded mounting groove adapted to the signboard is provided in the threaded mounting seat, a one-way air inlet valve is provided in the threaded mounting groove, and an air outlet end of the one-way air inlet valve is connected with an air inlet end of the compressed air storage tank.

The present disclosure has the following beneficial effects.

According to the present disclosure, baits are buried in the area where there may be termites after being placed in the termite monitoring and killing device, so as to induce foraging termites to enter. Termite images in the termite monitoring and killing device are acquired regularly, so that termite image data is transmitted to a monitoring information processing platform to be processed and analyzed through a data relay station, and termite situation data is obtained to be transmitted to a user control terminal, thus improving the data timeliness. The user checks the termite situation data through the user control terminal, and remotely controls the termite monitoring and killing device near a termite colony to deliver termite insecticide powder according to the analysis result of the termite situation data, so as to achieve the purpose of delivering powder accurately.

DETAILED DESCRIPTION OF THE EMBODIMENTS

The technical scheme in the embodiments of the present disclosure will be clearly and completely described with reference to the attached drawings hereinafter. Obviously, the described embodiments are only some of the embodiments of the present disclosure, rather than all of the embodiments. The embodiments in the present disclosure and the features in the embodiments can be combined with each other without conflict. Based on the embodiments of the present disclosure, all other embodiments obtained by those skilled in the art without creative labor belong to the scope of protection of the present disclosure.

Figure 1:
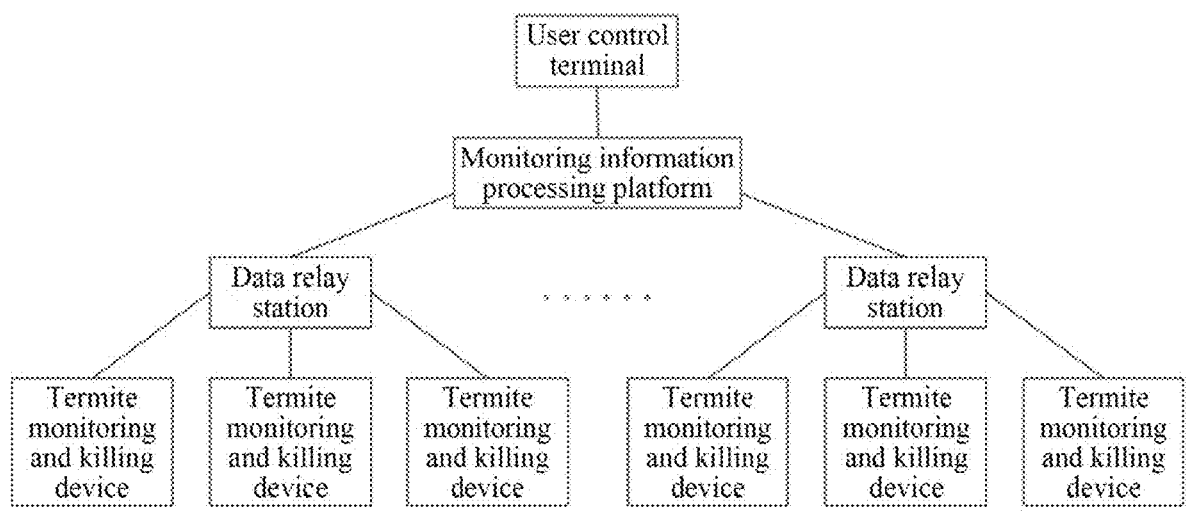
FIG. 1 is a system diagram of the present disclosure.
Figure 2:
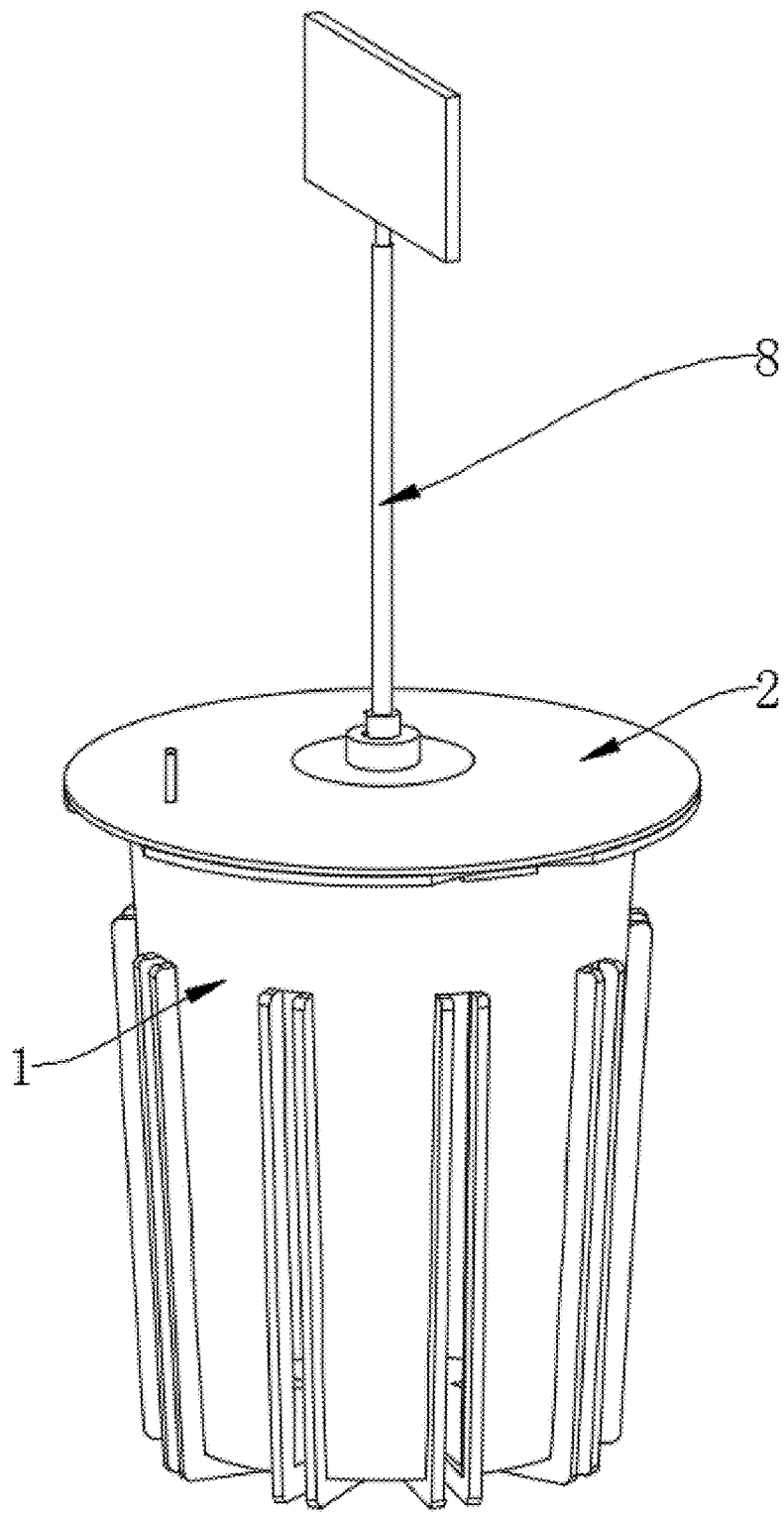
FIG. 2 is a perspective diagram of a termite monitoring and killing device according to the present disclosure.
Figure 3:
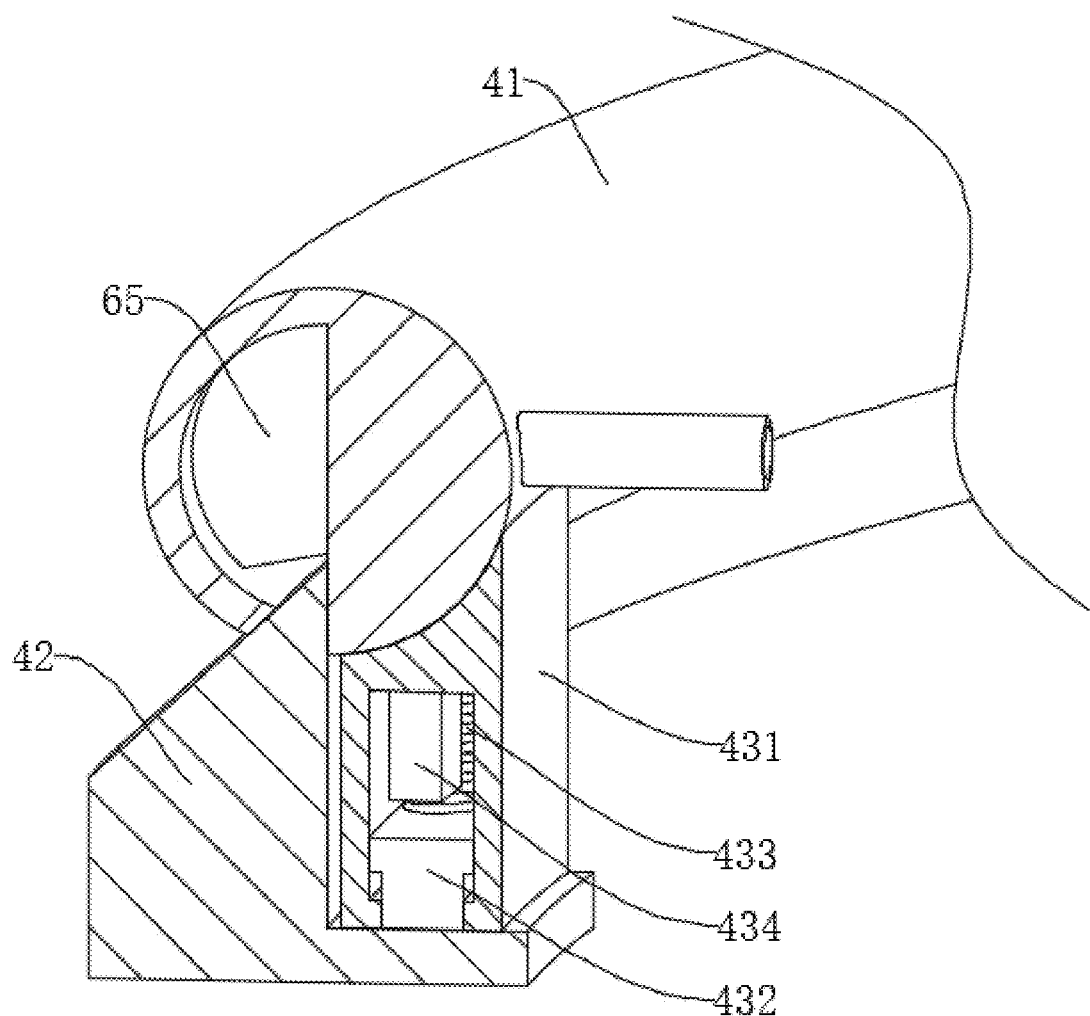
FIG. 3 is a structural diagram of a powder delivery mechanism according to the present disclosure.
Figure 4:
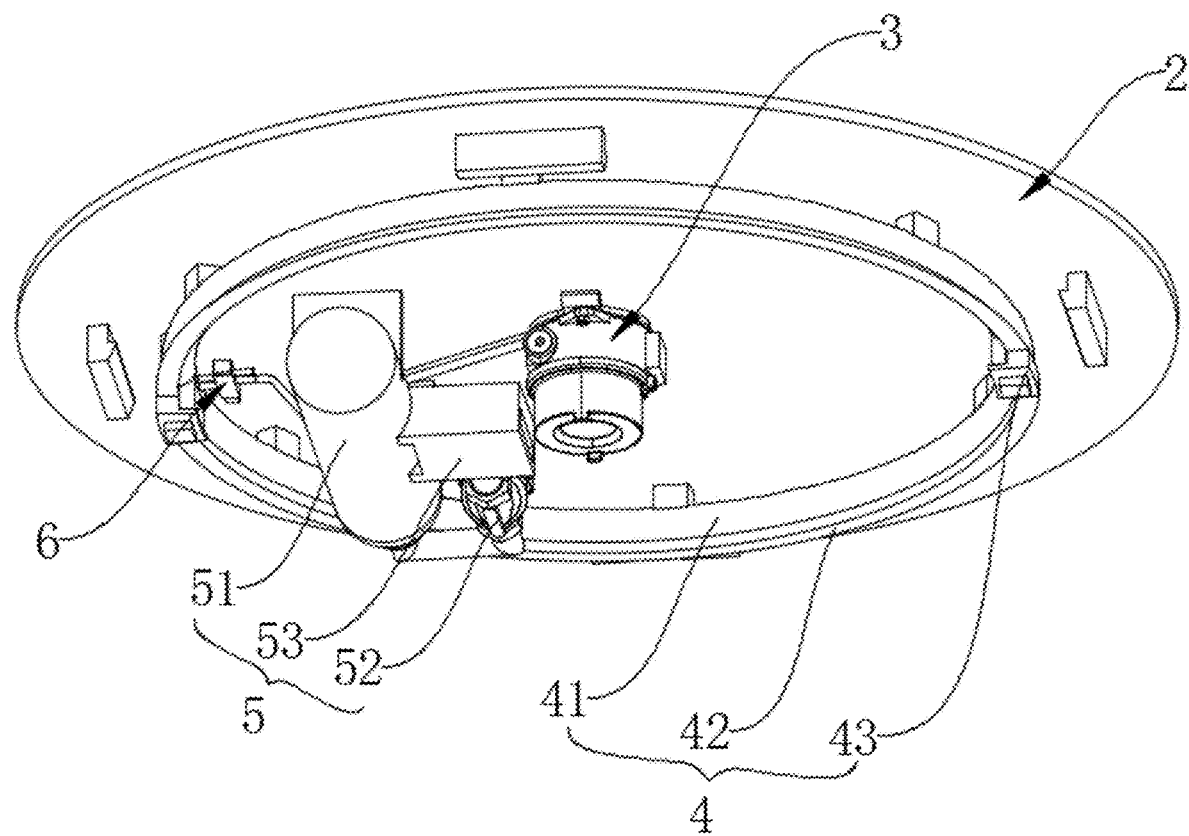
FIG. 4 is a structural diagram of a bottom of a barrel cover according to the present disclosure.
Figure 5:
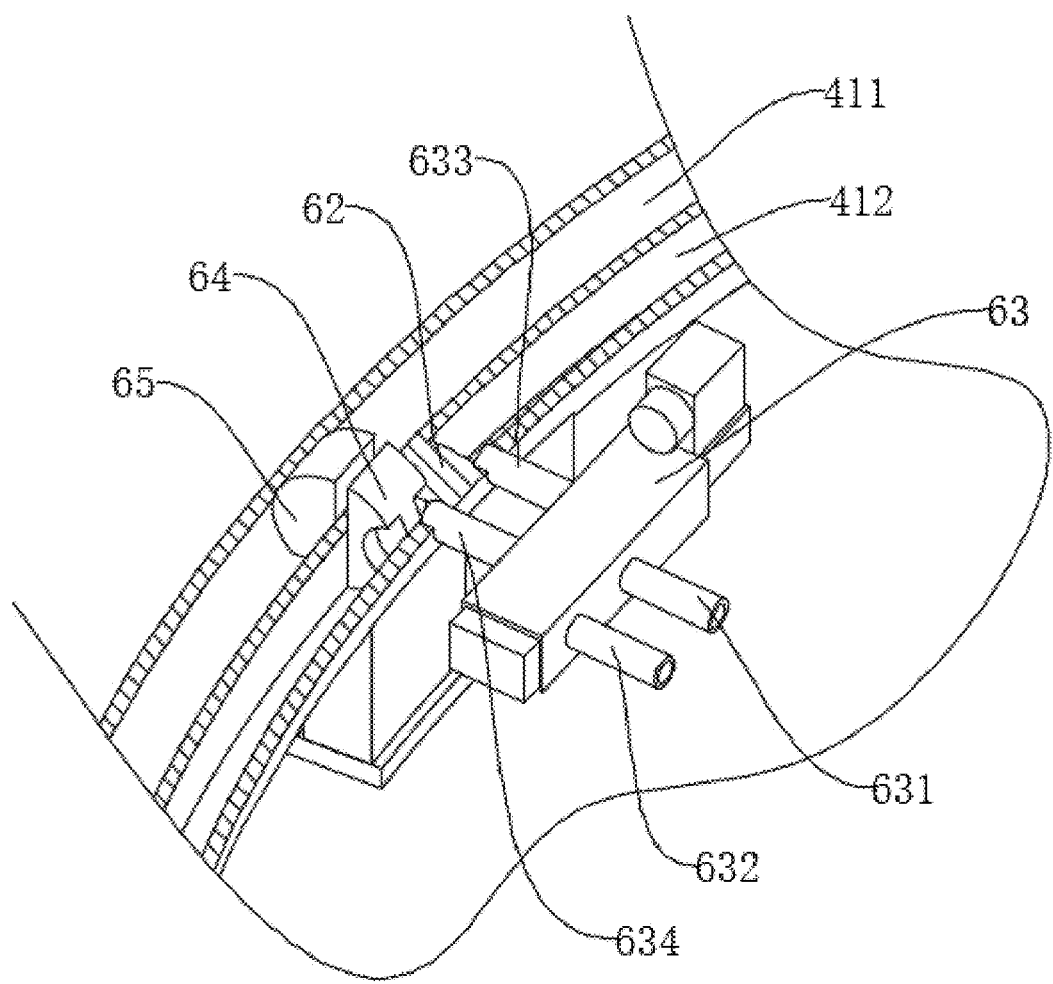
FIG. 5 is a structural diagram of a powder supplementing mechanism according to the present disclosure.
Figure 6:
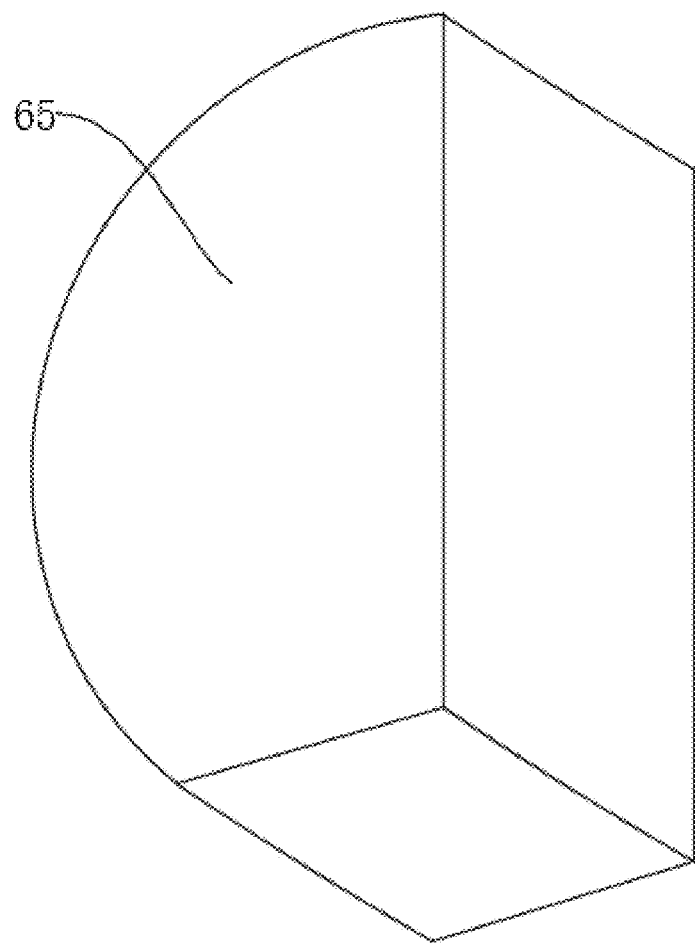
FIG. 6 is a structural diagram of a shifting block according to the present disclosure.
Figure 7:
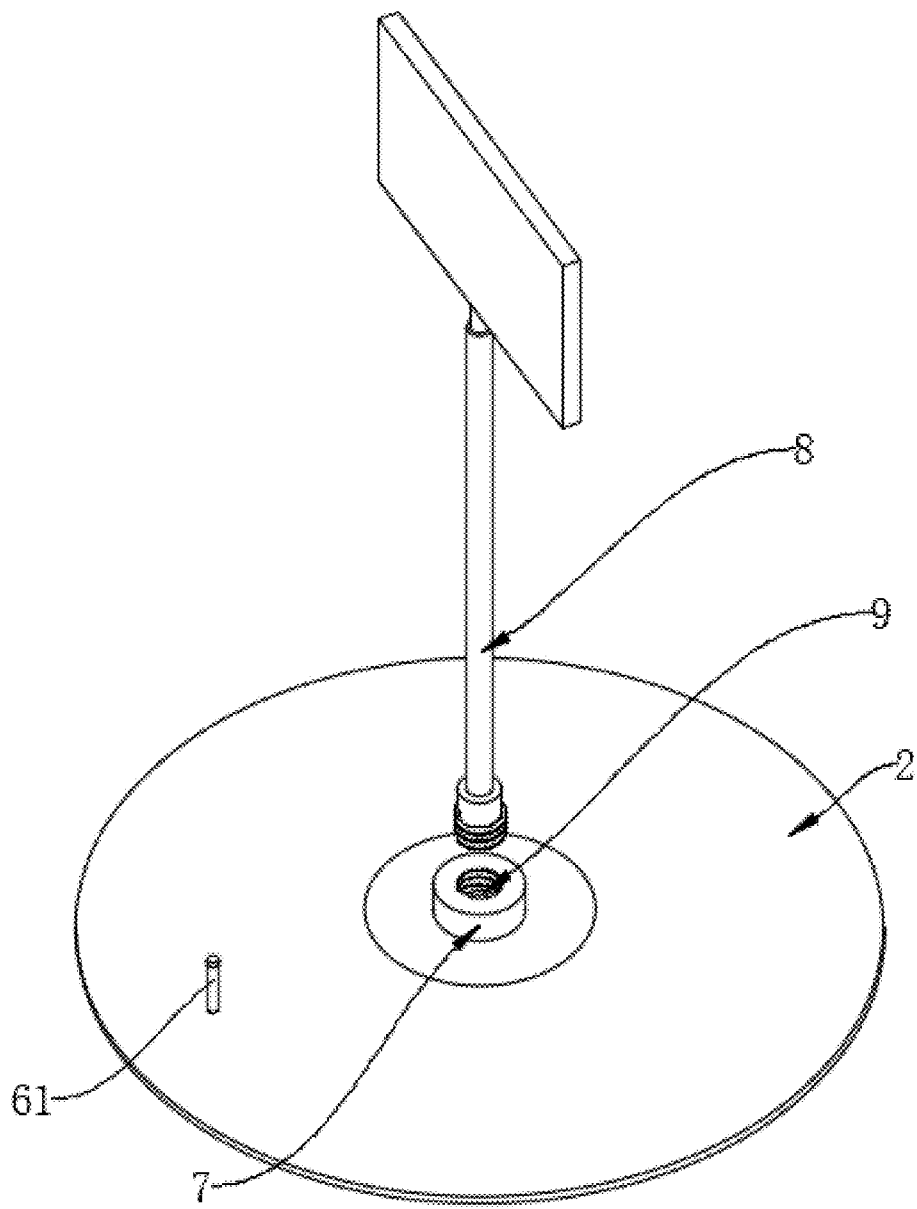
FIG. 7 is a structural diagram of a top of a barrel cover according to the present disclosure.

With reference to FIGS. 1 to 7, the present disclosure discloses a termite monitoring and killing system, including:

a plurality of termite monitoring and killing devices, where the plurality of termite monitoring and killing devices are distributed and buried in termite infested areas, and are configured to lure termites into the devices to feed, acquire a termite feeding image regularly, and deliver termite insecticide powder according to user requirements automatically or in a remote control manner;

at least one data relay station, where the data relay station is configured to be communicated with the plurality of termite monitoring and killing devices, and receive and send data;

a monitoring information processing platform, where the monitoring information processing platform is configured to be communicated with the data relay station, receive and summarize termite feeding image data, form continuous termite monitoring historical data after the obtained image data is removed by noise and abnormal data is filtered, analyze and obtain a distribution trend of a termite colony in an area where the termite monitoring and killing device is buried according to the time, the position and the number of termites in the termite monitoring historical data, analyze and simulate path data according to a distribution density of termites and the time when termites appear, determine a termite traveling path, analyze a path convergence node according to different traveling paths, predict data of an area where a mother colony is located according to the node distribution finally, and supplement, correct and verify an original analysis result in time when the subsequent data is supplemented;

a user control terminal, where the user control terminal is configured to log in to the monitoring information processing platform by a user to check termite monitoring data and usage of consumables in the termite monitoring and killing device, and to issue a control instruction to the monitoring information processing platform to control the operation of the termite monitoring and killing device.

According to the present disclosure, baits are buried in the area where there may be termites after being placed in the termite monitoring and killing device, so as to induce foraging termites to enter. Termite images in the termite monitoring and killing device are acquired regularly, so that termite image data is transmitted to a monitoring information processing platform to be processed and analyzed through a data relay station, and termite situation data is obtained to be transmitted to a user control terminal, thus improving the data timeliness. The user checks the termite situation data through the user control terminal, and remotely controls the termite monitoring and killing device near a termite colony to deliver termite insecticide powder according to the analysis result of the termite situation data, so as to achieve the purpose of delivering powder accurately. Moreover, the mother colony can be directly dug out according to backward inference of the area where the mother colony is located without delivering powder. Alternatively, the number of termite colonies in the area where the mother colony is located is analyzed after a period of powder delivery to judge the killing effect.

In an embodiment, the monitoring information processing platform includes an image identification module, an analyzing and processing module, a device management module and a communication interaction module. The image identification module is configured to identify the termite feeding image, count the number of termites in the image, and bind data about the number of termites with the position of the termite monitoring and killing device and the image acquisition time to obtain termite monitoring data. The analyzing and processing module is configured to process the summarized termite monitoring data, judge whether a summarized data amount meets a minimum processing requirement according to a preset threshold by comparing the summarized termite monitoring data with historical data, continue data acquisition if the data amount is low, analyze the termite traveling path through a data analysis algorithm if the data amount exceeds the threshold, and analyze an area where a termite colony is located according to the time and the density when termites appear. The device management module is configured to control the termite monitoring and killing device and the data relay station, receive operation information of the termite monitoring and killing device and the data relay station, and issue early warning information to the user control terminal when the device fails and usage of consumables exceeds a threshold range by setting an early warning threshold. The communication interaction module is configured to be communicated with the data relay station and the user control terminal.

Preferably, the monitoring information processing platform is provided with a termite situation early warning module. The user can set a threshold for triggering early warning. After the termite situation data exceeds the threshold, the early warning information can be optionally pushed to the user control terminal, or the delivery of termite insecticide powder can be automatically controlled according to the termite situation data.

In an embodiment, the termite monitoring and killing device includes a barrel body 1 and a barrel cover 2 provided at the top of the barrel body 1 detachably, a side wall of the barrel body 1 is provided with a plurality of strip-shaped holes through which termites enter the barrel body 1, and the bottom of the barrel cover 2 is provided with a monitoring camera 3 which is configured to monitor termites and a powder delivery mechanism 4 which is configured to deliver annular powder into the barrel body 1.

With this design, the barrel body 1 is placed in the hole dug near the ground where termites may harm. Thereafter, baits are placed in the barrel body 1, so as to induce termites. The baits are pine blocks or attractants. Subsequently, the barrel cover 2 is covered on the barrel body 1. The top of the barrel cover 2 is covered with soil to complete mounting. The monitoring camera 3 is controlled to regularly photograph the internal situation of the barrel body 1 to be transmitted to the data relay station. The data relay station transmits the data to the monitoring information processing platform. The monitoring information processing platform summarizes and processes the acquired data, so that the termite situation in the barrel body 1 can be known in time and quickly. When it is judged manually that it is necessary to deliver the powder to kill termites, the powder delivery mechanism 4 is turned on to deliver termite insecticide powder into the barrel body 1 annularly. The termites in the barrel body 1 feed the food contaminated with the powder to other termites, so that the whole termite colony can be killed. This not only improves the monitoring convenience, but also enables the powder to be stably stored for a long time and to be delivered in time and accurately when needed.

In the specific implementation, the monitoring camera 3 is provided in the center of the barrel cover 2. The monitoring camera 3 is provided with a fill light to improve the image acquisition quality. The barrel cover 2 is provided with a GPS positioning module, which is convenient for users to quickly find the position when consumables need to be supplemented or the device therein fails.

In an embodiment, the powder delivery mechanism 4 includes a hollow powder storage ring 41 provided at the bottom of the barrel cover 2. The bottom of the hollow powder storage ring 41 is provided with a powder outlet communicated with an inner cavity of the hollow powder storage ring 41. The bottom of the hollow powder storage ring 41 is provided with a blocking ring 42 and a driving component 43 configured to drive the blocking ring 42 to move up and down. The powder outlet is blocked by the blocking ring 42 when the blocking ring 42 is located at an upper limit position. The top of the blocking ring 42 is provided with an inclined plane for guiding powder to slide off the blocking ring 42.

With this design, after the driving component 43 drives the blocking ring 42 to move down, the powder therein can be uniformly dispersed into the barrel body 1 along the inclined plane of the blocking ring 42, covering all entrances and exits of termites as much as possible, and improving the killing efficiency and the stability.

In an embodiment, the driving component 43 includes at least one support 431 provided on the hollow powder storage ring 41. The bottom of the support 431 is provided with a T-shaped block 432 inserted into the support 431. One end of the T-shaped block 432 which is located outside the support 431 is connected to the blocking ring 42. One end of the T-shaped block 432 which is located inside the support 431 is provided with a tension spring 433 connected with the support 431. A telescopic cavity in which the T-shaped block 432 moves up and down is provided in the support 431. When the tension spring 433 is in a natural state, the powder outlet is blocked by the blocking ring 42. An electromagnet 434 which is located at the top of the T-shaped block 432 is provided in the telescopic cavity. The electromagnet 434 has the same magnetic pole as that of the opposite side of the T-shaped block 432.

With this design, the blocking ring 42 keeps blocking the powder outlet through the tension spring 433 in the natural state. However, when powder needs to be delivered, the T-shaped block 432 can be pushed down by the magnetic repulsion force only by controlling the electromagnet 434 to be turned on, so as to drive the blocking ring 42 to move down and complete the delivery of powder.

In the specific implementation, a plurality of micro vibration motors can be added at the bottom of the blocking ring 42, which can be started synchronously after the electromagnet 434 is turned on, so as to speed up the delivery of powder.

In an embodiment, the termite monitoring and killing device further includes a dirt cleaning mechanism 5 provided at the bottom of the barrel cover 2, which is configured to clean dirt attached to a camera end of the monitoring camera 3;

the dirt cleaning mechanism 5 includes a compressed air storage tank 51 provided at the bottom of the barrel cover 2, an electromagnetic valve 52 communicated with the compressed air storage tank 51 is provided on the compressed air storage tank 51, and an end of the electromagnetic valve 52 far away from the compressed air storage tank 51 is provided with a nozzle 53 for blowing air to the camera end of the monitoring camera 3.

With this design, the electromagnetic valve 52 can be turned on briefly before the monitoring camera 3 takes photos, so that the compressed air in the compressed air storage tank 51 can be sprayed to the monitoring camera 3 through the nozzle 53, and the dirt attached to the monitoring camera 3 can be blown away, thus improving the photographing quality of the monitoring camera 3.

In an embodiment, the inner cavity of the hollow powder storage ring 41 is provided with a powder storage area and a dispersing component working area which are independent from each other. The powder outlet is communicated with the powder storage area. The hollow powder storage ring 41 is provided with a powder supplementing mechanism 6.

The powder supplementing mechanism 6 includes a powder injection pipe 61 communicated with the powder storage area, a partition plate 62 provided in the dispersing component working area and a three-position four-way valve 63 communicated with the dispersing component working area. The three-position four-way valve 63 is provided with an air inlet pipe 631, an air outlet pipe 632, a first connecting pipe 633, and a second connecting pipe 634. The air inlet pipe 631 is communicated with the compressed air storage tank 51. The first connecting pipe 633 and the second connecting pipe 634 are both communicated with the dispersing component working area and are located at both sides of the partition plate 62. The three-position four-way valve 63 is configured to switch the state that the air inlet pipe 631 and the air outlet pipe 632 are communicated with the first connecting pipe 633 and the second connecting pipe 634.

The powder supplementing mechanism 6 further includes a piston 64 provided in the dispersing component working area and a shifting block 65 provided in the powder storage area. The piston 64 and the shifting block 65 are attracted to each other through magnetism. The piston 64 is provided with grooves at both sides along the moving direction of the dispersing component working area, through which the first connecting pipe 633 and the second connecting pipe 634 supply air. The bottom of the shifting block 65 is provided with through-holes through which powder passes, so that the powder higher than the through-holes is pushed by the shifting block 65 to be laid at the rest of the powder storage area in the moving process of the shifting block 65.

With this design, after the powder in the powder storage area is consumed, maintainers can supplement powder to the powder storage area through the powder injection pipe 61. Because powder entering the powder storage area is in an accumulated state, the air inlet pipe 631 is communicated with the first connecting pipe 633 or the second connecting pipe 634 close to the piston 64 by switching the operating state of the three-position four-way valve 63, so that air in the compressed air storage tank 51 pushes the piston 64 to move in the dispersing component working area. Under the action of the magnetic force, the shifting block 65 is driven to push the accumulated powder to be uniformly dispersed in the powder storage area. The piston 64 can move back and forth in the dispersing component working area by switching the operating state of the three-position four-way valve 63 back and forth, so as to ensure the powder to be uniformly dispersed. In this way, maintainers do not need to remove the barrel cover 2 from the buried area when supplementing powder, so that it is high in maintenance convenience.

It should be noted that when the three-position four-way valve 63 is in a non-operating state, the three-position four-way valve 63 disconnects the air inlet pipe 631 from the first connecting pipe 633 or the second connecting pipe 634.

In the specific implementation, the top end of the powder injection pipe 61 is detachably provided with a protective cap to block the powder injection pipe 61 when the powder injection pipe 61 is not used, so as to prevent external liquid or other impurities from entering the powder storage area from the powder injection pipe 61.

In an embodiment, the top of the barrel cover 2 is provided with a threaded mounting seat 7, and the threaded mounting seat 7 is in threaded connection with a signboard 8 for marking the position of the barrel body 1 and warning people around, which is convenient for maintainers to find the termite monitoring and killing device requiring maintenance.

In an embodiment, a threaded mounting groove adapted to the signboard 8 is provided in the threaded mounting seat 7. A one-way air inlet valve 9 is provided in the threaded mounting groove. An air outlet end of the one-way air inlet valve 9 is connected with an air inlet end of the compressed air storage tank 51.

With this design, after the air storage capacity in the compressed air storage tank 51 is insufficient, the signboard 8 is removed by rotation, and then an air filled pipe is connected to the one-way air inlet valve 9. Thereafter, air can be supplemented to the compressed air storage tank 51, so that the barrel cover 2 does not need to be dug out, and the maintenance convenience is improved.

It should be noted that if there are directional indications (such as up, down, left, right, front, back, etc.) in the embodiment of the present disclosure, the directional indications only serve to explain the relative position relationship and the movement situation among components in a specific posture (as shown in the attached figures). If the specific posture changes, the directional indications will also change accordingly.

In addition, if there are descriptions related to "first" and "second" in the embodiment of the present disclosure, the descriptions of "first" and "second" are only used for the purpose of description, but cannot be understood as indicating or implying their relative importance or implicitly indicating the number of indicated technical features. Therefore, the features defined as "first" and "second" can explicitly or implicitly include at least one of the features. In addition, the technical schemes of various embodiment can be combined with each other, which must be based on the fact that those skilled in the art can implement the technical schemes. When the combination of the technical schemes is contradictory or impossible, it should be considered that the combination of the technical schemes does not exist and is not within the scope of protection claimed by the present disclosure.

In addition, "a plurality of" refers to more than two.

The above is only the preferred embodiment of the present disclosure, which is not used to limit the present disclosure. Any modification, equivalent substitution, improvement, etc. made within the spirit and the principle of the present disclosure should be included in the scope of protection of the present disclosure.

What is claimed is:

1. A termite monitoring and killing system, comprising:
    a plurality of termite monitoring and killing devices, wherein the plurality of termite monitoring and killing devices are distributed and buried in termite infested areas, and are configured to lure termites into the devices to feed, acquire a termite feeding image regularly, and deliver termite insecticide powder according to user requirements;
    at least one data relay station, wherein the data relay station is configured to be communicated with the plurality of termite monitoring and killing devices, and receive and send data;
    a monitoring information processing platform, wherein the monitoring information processing platform is configured to be communicated with the data relay station, receive and summarize termite feeding image data, form continuous termite monitoring historical data after obtained image data is removed by noise and abnormal data is filtered, analyze and obtain a distribution trend of a termite colony in an area where the termite monitoring and killing device is buried according to time, a position and the number of termites in the termite monitoring historical data, analyze and simulate path data according to a distribution density of termites and the time when termites appear, determine a termite traveling path, analyze a path convergence node according to different traveling paths, predict data of an area where a mother colony is located according to the node distribution finally, and supplement, correct and verify an original analysis result in time when the subsequent data is supplemented; and
    a user control terminal, wherein the user control terminal is configured to log in to the monitoring information processing platform by a user to check termite monitoring data and usage of consumables in the termite monitoring and killing device, and to issue a control instruction to the monitoring information processing platform to control an operation of the termite monitoring and killing device;
    wherein the termite monitoring and killing device comprises a barrel body and a barrel cover provided at a top of the barrel body detachably, a side wall of the barrel body is provided with a plurality of strip-shaped holes through which termites enter the barrel body, and a bottom of the barrel cover is provided with a monitoring camera which is configured to monitor termites and a powder delivery mechanism which is configured to deliver annular powder into the barrel body.

2. The termite monitoring and killing system according to claim 1, wherein the monitoring information processing platform comprises an image identification module, an analyzing and processing module, a device management module and a communication interaction module;
    the image identification module is configured to identify the termite feeding image, count the number of termites in the image, and bind data about the number of termites with a position of the termite monitoring and killing device and an image acquisition time to obtain termite monitoring data;
    the analyzing and processing module is configured to process the summarized termite monitoring data, judge whether a summarized data amount meets a minimum processing requirement according to a preset threshold by comparing the summarized termite monitoring data with historical data, continue data acquisition if the data amount is low, analyze the termite traveling path through a data analysis algorithm if the data amount exceeds the threshold, and analyze an area where a termite colony is located according to the time and the density when termites appear;
    the device management module is configured to control the termite monitoring and killing device and the data relay station, receive operation information of the termite monitoring and killing device and the data relay station, and issue early warning information to the user control terminal when the device fails and usage of consumables exceeds a threshold range by setting an early warning threshold; and
    the communication interaction module is configured to be communicated with the data relay station and the user control terminal.

3. The termite monitoring and killing system according to claim 1, wherein the powder delivery mechanism comprises a hollow powder storage ring provided at the bottom of the barrel cover, a bottom of the hollow powder storage ring is provided with a powder outlet communicated with an inner cavity of the hollow powder storage ring, the bottom of the hollow powder storage ring is provided with a blocking ring and a driving component configured to drive the blocking ring to move up and down, the powder outlet is blocked by the blocking ring when the blocking ring is located at an upper limit position, and a top of the blocking ring is provided with an inclined plane for guiding powder to slide off the blocking ring.

4. The termite monitoring and killing system according to claim 3, wherein the driving component comprises at least one support provided on the hollow powder storage ring,
a bottom of the support is provided with a T-shaped block inserted into the support, one end of the T-shaped block which is located outside the support is connected to the blocking ring, one end of the T-shaped block which is located inside the support is provided with a tension spring connected with the support, a telescopic cavity in which the T-shaped block moves up and down is provided in the support,
when the tension spring is in a natural state, the powder outlet is blocked by the blocking ring, an electromagnet which is located at a top of the T-shaped block is provided in the telescopic cavity, and the electromagnet has a same magnetic pole as that of an opposite side of the T-shaped block.

5. The termite monitoring and killing system according to claim 3, wherein the termite monitoring and killing device further comprises a dirt cleaning mechanism provided at the bottom of the barrel cover, which is configured to clean dirt attached to a camera end of the monitoring camera;
the dirt cleaning mechanism comprises a compressed air storage tank provided at the bottom of the barrel cover, an electromagnetic valve communicated with the compressed air storage tank is provided on the compressed air storage tank, and an end of the electromagnetic valve far away from the compressed air storage tank is provided with a nozzle for blowing air to the camera end of the monitoring camera.

6. The termite monitoring and killing system according to claim 5, wherein the inner cavity of the hollow powder storage ring is provided with a powder storage area and a dispersing component working area which are independent from each other, the powder outlet is communicated with the powder storage area, and the hollow powder storage ring is provided with a powder supplementing mechanism;
the powder supplementing mechanism comprises a powder injection pipe communicated with the powder storage area, a partition plate provided in the dispersing component working area and a three-position four-way valve communicated with the dispersing component working area, the three-position four-way valve is provided with an air inlet pipe, an air outlet pipe, a first connecting pipe, and a second connecting pipe, the air inlet pipe is communicated with the compressed air storage tank, the first connecting pipe and the second connecting pipe are both communicated with the dispersing component working area and are located at both sides of the partition plate, and the three-position four-way valve is configured to switch the state that the air inlet pipe and the air outlet pipe are communicated with the first connecting pipe and the second connecting pipe;
the powder supplementing mechanism further comprises a piston provided in the dispersing component working area and a shifting block provided in the powder storage area, the piston and the shifting block are attracted to each other through magnetism, the piston is provided with grooves at both sides along the moving direction of the dispersing component working area, through which the first connecting pipe and the second connecting pipe supply air, and the bottom of the shifting block is provided with through-holes through which powder passes.

7. The termite monitoring and killing system according to claim 5, wherein the top of the barrel cover is provided with a threaded mounting seat, and the threaded mounting seat is in threaded connection with a signboard for marking the position of the barrel body and warning people around.

8. The termite monitoring and killing system according to claim 7, wherein a threaded mounting groove adapted to the signboard is provided in the threaded mounting seat, a one-way air inlet valve is provided in the threaded mounting groove, and an air outlet end of the one-way air inlet valve is connected with an air inlet end of the compressed air storage tank.

9. A termite monitoring and killing system, comprising:
a plurality of termite monitoring and killing devices, wherein the plurality of termite monitoring and killing devices are distributed and buried in termite infested areas, and are configured to lure termites into the devices to feed, acquire a termite feeding image regularly, and deliver termite insecticide powder according to user requirements;
at least one data relay station, wherein the data relay station is configured to be communicated with the plurality of termite monitoring and killing devices, and receive and send data;
a monitoring information processing platform, wherein the monitoring information processing platform is configured to be communicated with the data relay station, receive and summarize termite feeding image data, form continuous termite monitoring historical data after obtained image data is removed by noise and abnormal data is filtered, analyze and obtain a distribution trend of a termite colony in an area where the termite monitoring and killing device is buried according to time, a position and the number of termites in the termite monitoring historical data, analyze and simulate path data according to a distribution density of termites and the time when termites appear, determine a termite traveling path, analyze a path convergence node according to different traveling paths, predict data of an area where a mother colony is located according to the node distribution finally, and supplement, correct and verify an original analysis result in time when the subsequent data is supplemented; and
a user control terminal, wherein the user control terminal is configured to log in to the monitoring information processing platform by a user to check termite monitoring data and usage of consumables in the termite monitoring and killing device, and to issue a control instruction to the monitoring information processing platform to control an operation of the termite monitoring and killing device;
wherein the monitoring information processing platform comprises an image identification module, an analyzing and processing module, a device management module and a communication interaction module;
the image identification module is configured to identify the termite feeding image, count the number of termites in the image, and bind data about the number of termites with a position of the termite monitoring and killing device and an image acquisition time to obtain termite monitoring data;
the analyzing and processing module is configured to process the summarized termite monitoring data, judge whether a summarized data amount meets a minimum processing requirement according to a preset threshold by comparing the summarized termite monitoring data with historical data, continue data acquisition if the data amount is low, analyze the termite traveling path through a data analysis algorithm if the data amount exceeds the threshold, and analyze an area where a termite colony is located according to the time and the density when termites appear;

the device management module is configured to control the termite monitoring and killing device and the data relay station, receive operation information of the termite monitoring and killing device and the data relay station, and issue early warning information to the user control terminal when the device fails and usage of consumables exceeds a threshold range by setting an early warning threshold; and the communication interaction module is configured to be communicated with the data relay station and the user control terminal.

\* \* \* \* \*